(12) United States Patent
Xie

(10) Patent No.: US 12,196,333 B1
(45) Date of Patent: Jan. 14, 2025

(54) CONCEALED VALVE BODY, CONCEALED VALVE, AND CONCEALED FAUCET

(71) Applicant: Guangdong Yawei Bathroom Technology Co., Ltd, Guangdong (CN)

(72) Inventor: Zhonghui Xie, Guangdong (CN)

(73) Assignee: Guangdong Yawei Bathroom Technology Co., Ltd, Jiangmen (CN)

( * ) Notice: Subject to any disclaimer, the term of this patent is extended or adjusted under 35 U.S.C. 154(b) by 0 days.

(21) Appl. No.: 18/680,238

(22) Filed: May 31, 2024

(51) Int. Cl.
  *F16K 11/00* (2006.01)
  *E03C 1/04* (2006.01)
(52) U.S. Cl.
  CPC .......... *F16K 19/006* (2013.01); *E03C 1/0403* (2013.01); *E03C 1/0408* (2013.01)
(58) Field of Classification Search
  CPC .............. F16K 11/076; F16K 11/0836; F16K 11/0856; F16K 11/22; F16K 19/006; E03C 1/0403; E03C 1/0408
  See application file for complete search history.

(56) References Cited

U.S. PATENT DOCUMENTS

| | | | | |
|---|---|---|---|---|
| 6,021,952 A * | 2/2000 | Antoniello | .............. | F16K 15/18 137/614.17 |
| 8,366,013 B2 * | 2/2013 | Chang | ................ | G05D 23/1393 236/12.21 |
| 2002/0179144 A1 * | 12/2002 | Dempsey | .............. | F16K 19/003 137/98 |
| 2006/0243813 A1 * | 11/2006 | Beck | .................. | G05D 23/1353 236/12.21 |
| 2011/0126919 A1 * | 6/2011 | Izzy | ...................... | F16K 19/006 137/606 |
| 2018/0313066 A1 * | 11/2018 | Ye | ......................... | E03C 1/0408 |

FOREIGN PATENT DOCUMENTS

CN  210661483 U  *  6/2020

* cited by examiner

*Primary Examiner* — Reinaldo Sanchez-Medina

(57) ABSTRACT

A concealed valve body includes: a water mixing seat, including a water mixing chamber, a first inlet hole communicated with the water mixing chamber, and a second inlet hole communicated with the water mixing chamber; a first inlet pipe, having a first inlet channel that is communicated with the first inlet hole; a second inlet pipe, having a second inlet channel communicated with the second inlet hole. The first inlet hole and the second inlet hole are distributed along an axial direction of the water mixing chamber, and a height difference is present between the first inlet hole and the second inlet hole.

19 Claims, 13 Drawing Sheets

B-B

A-A

F-F

US 12,196,333 B1

CONCEALED VALVE BODY, CONCEALED VALVE, AND CONCEALED FAUCET

TECHNICAL FIELD

The present disclosure relates to the field of faucets of bathroom, and in particular to a concealed valve body, a concealed valve, and a concealed faucet.

BACKGROUND

In the art, most of wall-mounted faucets in bathrooms are concealed (i.e., the faucet is at least partially mounted inside the wall), and that is, a valve body of the faucet is buried in the wall, and only an operating switch is exposed. In this way, the faucet is mounted easily, and a large space is saved, and therefore, such a mounting method is widely applied.

In the art, the concealed faucet includes a concealed valve body. The concealed valve body includes a water mixing seat, a hot water inlet pipe and a cold water inlet pipe. The hot water inlet pipe and the cold water inlet pipe are fluidly connected to the water mixing seat. Hot water in the hot water inlet pipe and cold water in the cold water inlet pipe are transferred to the water mixing seat, mixed in the water mixing seat, and then output.

However, in practice, the cold water and the hot water in the water mixing seat may not be evenly mixed, and therefore, a temperature of warm water output from the faucet is not ideal.

SUMMARY OF THE DISCLOSURE

The present disclosure provides a concealed valve body including: a water mixing seat, including a water mixing chamber, a first inlet hole communicated with the water mixing chamber, and a second inlet hole communicated with the water mixing chamber; a first inlet pipe, having a first inlet channel that is communicated with the first inlet hole; a second inlet pipe, having a second inlet channel communicated with the second inlet hole. The first inlet hole and the second inlet hole are distributed along an axial direction of the water mixing chamber, and a height difference is present between the first inlet hole and the second inlet hole.

The present disclosure further provides a concealed valve, including: the concealed valve body as described in the above; a mixing valve core, mounted in the water mixing cavity; a first check valve, mounted in the first inlet pipe; and a second check valve, mounted in the second inlet pipe.

The present disclosure further provides a concealed faucet, including: a displaying device, having a concealed side and a displaying side provided opposite to the concealed side; the concealed valve as described in the above, being disposed on the concealed side, wherein, the mixing valve core extends through the displaying device to protrude out of the displaying side; and a water-mixing operation switch, disposed on the displaying side and connected to the mixing valve core, wherein the water-mixing operation switch is configured to control the mixing valve core.

REFERENCE NUMERALS IN THE DRAWINGS

Figure 1:
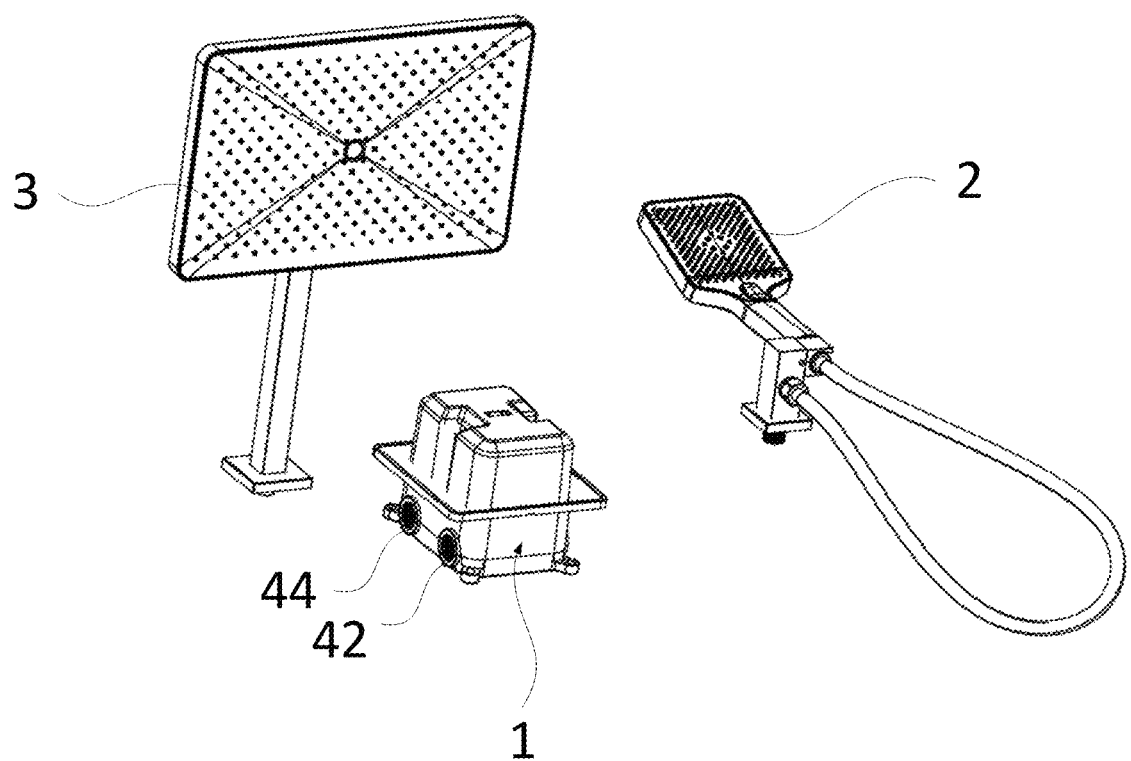
FIG. 1 is a schematic view of a concealed faucet, a top showerhead, and a handheld showerhead according to an embodiment of the present disclosure.

1, concealed faucet; 2, handheld showerhead; 3, a top showerhead;

10, concealed valve; 20, displaying device; 30, base; 40, housing; 50, upper cover; 60, water-mixing operation switch; 70, first water-outlet operation switch; 80, second water-outlet operation switch;

11, concealed valve body; 12, mixing valve core; 13, first check valve; 14, second check valve; 15, first water outlet valve; 16, second water outlet valve; 17, mixing valve core sleeve; 18, first outlet valve sleeve; 19, second outlet valve sleeve;

111, water mixing seat; 1111, water mixing chamber; 1112, first inlet hole; 1113, second inlet hole; 1114, first guide port; 1115, second guide port; 1116, first separating ring; 1117, second separating ring;

112, connection member; 1121, connection channel; 1122, slot;

113, water diverting seat; 1131, water diverting cavity; 1132, first outlet hole; 1133, second outlet hole;

114, first inlet pipe; 1141, first inlet channel; 1142, first mounting slot; 1143, third guide port;

115, second inlet pipe; 1151, second inlet channel; 1152, second mounting slot; 1153, fourth guide port;

116, first outlet pipe; 1161, first outlet chamber; 1162, first outlet channel;
117, second outlet pipe; 1171, second outlet chamber; 1172, second outlet channel;
118, blocker;
41, first mounting hole; 42, second mounting hole; 43, third mounting hole; 44, fourth mounting hole.

DETAILED DESCRIPTION

In order to make the purposes, features and advantages of the present disclosure more apparent and understandable, specific embodiments of the present disclosure will be described in detail by referring to the accompanying drawings. Many specific details are described in the following description to facilitate a full understanding of the present disclosure. However, the present disclosure can be implemented in many other ways different from those described herein. Any ordinary skilled person in the art can make similar improvements without departing from the concept of the present disclosure. The present application is not limited by the specific embodiments disclosed below.

In the description of the present application, the terms "center", "longitudinal", "lateral", "length", "width", "thickness", "up", "down", "front", "rear", "left", "right", "vertical" "horizontal", "top", "bottom", "inside", "outside", "clockwise", "counterclockwise", "axial", "radial", "circumferential", and so on, indicate orientation or positional relationships based on those shown in the accompanying drawings, and are used only to facilitate and simplify description of the present disclosure. These terms are not intended to indicate or imply that the device or elements must have a particular orientation or must be constructed and operated in a particular orientation, and therefore, the terms cannot be interpreted as a limitation of the present disclosure.

Furthermore, the terms "first" and "second" are used for descriptive purposes only and shall not be understood as indicating or implying relative importance or implicitly specifying the number of technical features indicated. Therefore, a feature defined by the "first" or the "second" may expressly or implicitly include at least one such feature. In the present disclosure, "plurality" means at least two, such as two, three, and so on, unless otherwise expressly and specifically limited.

In the present application, unless otherwise expressly provided and limited, the terms "mounting", "connected", "coupled", "fixed", and so on, shall be broadly interpreted. For example, connected may be fixed or detachable or integral connection; or may be mechanical or electrical connection; or may be direct connection or indirect connection through an intermediate; or may be internal connection within two elements, unless otherwise expressly limited. Any ordinary skilled person in the art shall understand specific meanings of the above terms herein case by case.

In the present disclosure, unless otherwise expressly provided and limited, a first feature being "above" or "below" a second feature may be a direct contact between the first feature and the second feature; or may be an indirect contact between the first feature and the second feature having an intermediate medium disposed therebetween. Furthermore, the first feature being "above", "on top of" and "on" the second feature may be that the first feature is directly located above or diagonally located above the second feature; or simply means that the first feature is horizontally higher than the second feature. The first feature is "below", "under" and "underneath" the second feature may be that the first feature is directly located below or diagonally located below the second feature; or simply means that the first feature is horizontally lower than the second feature.

It should be noted that when an element is "fixed to" or "arranged with" another element, it is indicated that the element is directly located on the another element; or an intermediate element may be located therebetween. When an element is "connected" to another element, it is indicated that the element is directly attached to the another element; or an intermediate element may be located therebetween. The terms "vertical", "horizontal", "up", "down", "left," "right," and similar expressions are used herein for illustrative purposes only, and it is not an exclusive means of implementation.

In the art, most of wall-mounted faucets in bathrooms are concealed (also known as in-wall mounted), and that is, a valve body of the faucet is buried in the wall, only an operating switch is exposed. In this way, the faucet is mounted easily, and a large space is saved, and therefore, such a mounting method is widely applied.

Figure 2:
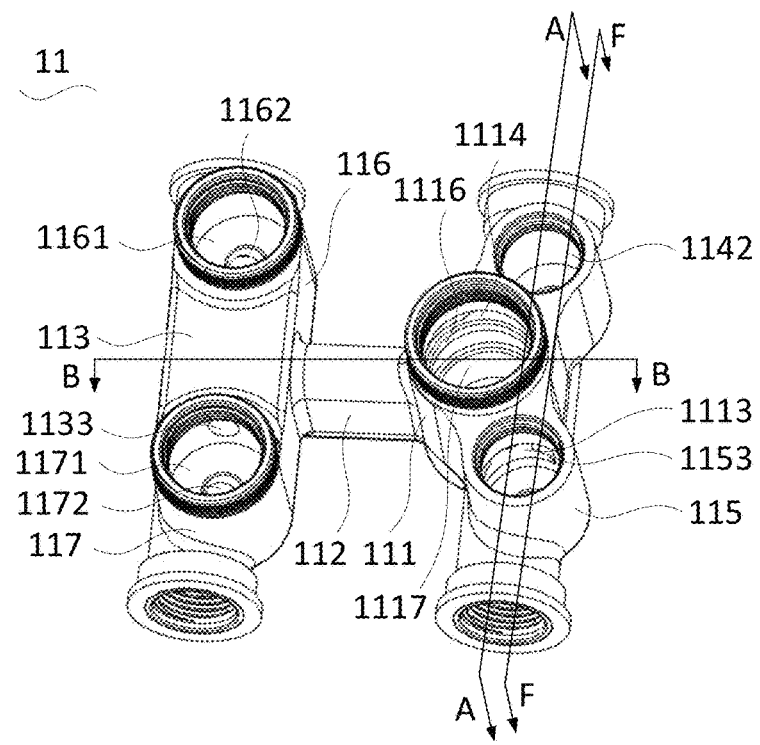
FIG. 2 is a schematic view of a concealed valve body according to an embodiment of the present disclosure.
Figure 3:
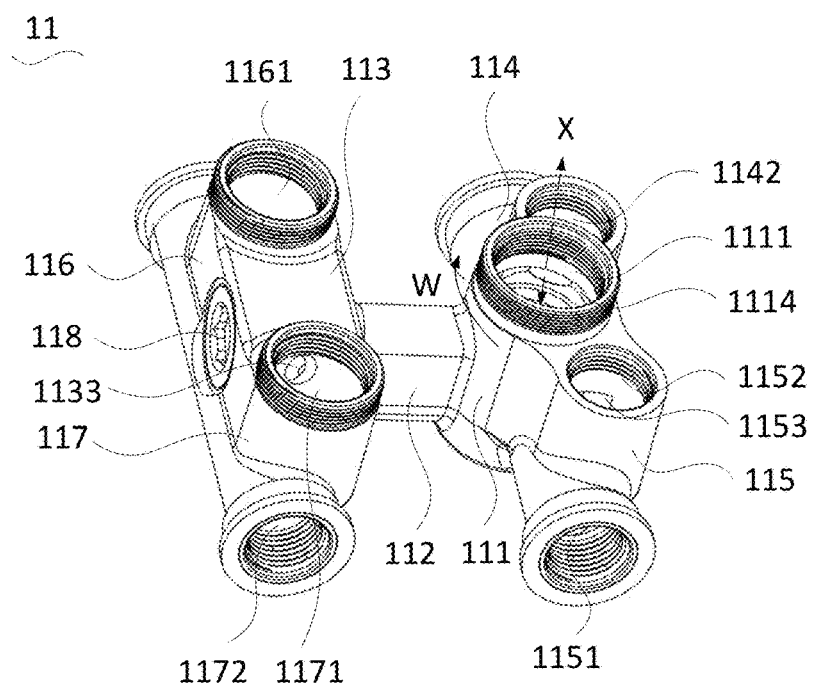
FIG. 3 is a schematic view of the concealed valve body shown in FIG. 2 being rotated for an angle.
Figure 4:
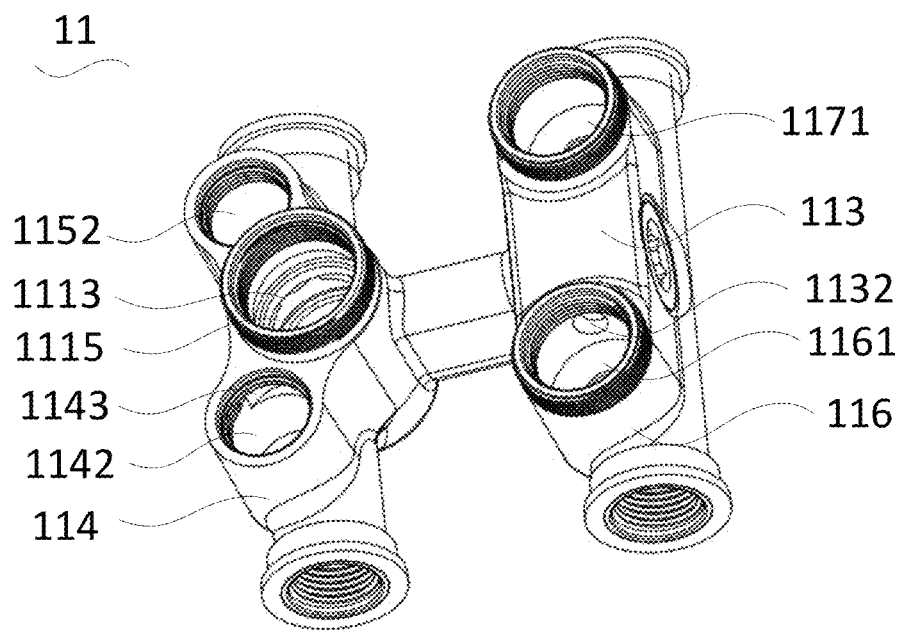
FIG. 4 is a schematic view of the concealed valve body shown in FIG. 2 being viewed from another viewing angle.
Figure 5:
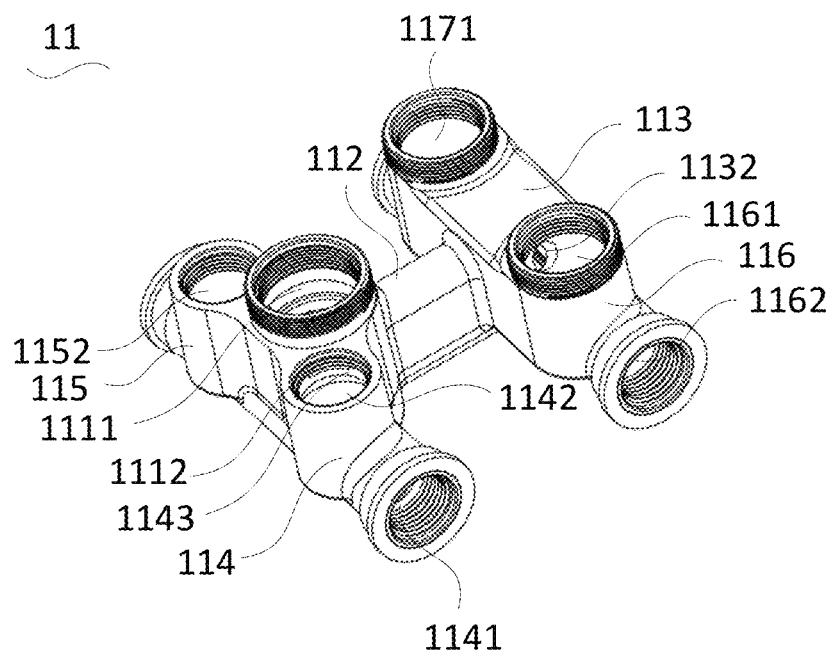
FIG. 5 is a schematic view of the concealed valve body shown in FIG. 4 being rotated for an angle.

As shown in FIGS. 1 and 2, in the art, a concealed faucet 1 generally includes a concealed valve body 11. The concealed valve body 11 includes a water mixing seat 111, a hot water inlet pipe and a cold water inlet pipe. The hot water inlet pipe and the cold water inlet pipe are fluidly connected to the water mixing seat 111. Hot water in the hot water inlet pipe and cold water in the cold water inlet pipe are transferred to the water mixing seat 111, mixed in the water mixing seat 111, and then output out of the faucet.

However, in practice, the cold water and the hot water in the water mixing seat may not be evenly mixed, and therefore, a temperature of warm water output from the faucet is not ideal The inventor of the present disclosure discovers that a key factor leading to uneven mixing of the hot water and the cold water is that a time length of mixing the cold water and the hot water is too short, and therefore, the cold water and the hot water are not sufficiently mixed with each other.

As shown in FIGS. 2 to 9, in order to solve the problem of uneven mixing of the cold water and the hot water, the present disclosure provides a concealed valve body 11 including a water mixing seat 111, a connection member 112, a water diverting seat 113, a first inlet pipe 114, a second inlet pipe 115, a first outlet pipe 116, and a second outlet pipe 117.

As shown in FIGS. 6 to 9, the water mixing seat 111 includes a water mixing chamber 1111, a first inlet hole 1112 communicated with the water mixing chamber 1111, and a second inlet hole 1113 communicated with the water mixing chamber 1111. The first inlet hole 1112 and the second inlet hole 1113 are disposed along an axial direction of the water mixing chamber 1111 (indicated by the arrow X in FIGS. 3 and 6), and there is a height difference between the first inlet hole 1112 and the second inlet hole 1113. For example, the second inlet hole 1113 is located away from, with respect to the first inlet hole 1112, an opening of the water mixing chamber 1111.

In addition, the water mixing seat 111 is fixedly connected and fluidly communicated with the first inlet pipe 114 and the second inlet pipe 115. For example, the water mixing seat 111, the first inlet pipe 114, and the second inlet pipe 115 are configured as a one-piece and integral structure. The first inlet pipe 114 has a first inlet channel 1141, and the second inlet pipe 115 has a second inlet channel 1151. The first inlet channel 1141 is communicated with the water mixing chamber 1111 through the first inlet hole 1112. The second inlet runner 1151 is communicated with the water mixing chamber 1111 through the second inlet hole 1113. The first inlet pipe 114 is one of the cold water inlet pipe and the hot water inlet pipe, and the second inlet pipe 115 is the other one of the cold water inlet pipe and the hot water inlet pipe.

For illustration, in the following example, the first inlet pipe 114 is the cold water inlet pipe, and cold water flows in the first inlet channel 1141; and the second inlet pipe 115 is the hot water inlet pipe, and the hot water flows in the second inlet channel 1151.

In an example, a shape of the first inlet channel 1141 is the same as a shape of the second inlet channel 1151. For example, the first inlet channel 1141 and the second inlet channel 1151 may be processed by performing a same processing method and may be molded by using a same mold. The shape of the first inlet channel 1141 being the same as the shape of the second inlet channel 1151 means that the shape of the first inlet channel 1141 is substantially the same as the shape of the second inlet channel 1151, and there may be a certain processing error.

In practice, the first inlet channel 1141 inputs the cold water into the water mixing chamber 1111 through the first inlet hole 1112, and the second inlet channel 1151 inputs the hot water into the water mixing chamber 1111 through the second inlet hole 1113. The cold water and hot water are mixed in the water mixing chamber 1111 and are output out of the water mixing chamber 1111. Since the first inlet hole 1112 and the second inlet hole 1113 are disposed along the axial direction of the water mixing chamber 1111 and there is a height difference between the first inlet hole 1112 and the second inlet hole 1113, a time length that the cold water and the hot water stay in the water mixing chamber 1111 is increased. In this way, the cold water and the hot water may be fully and evenly mixed with each other, the temperature of the warm water after the mixing may be ideal.

As shown in FIGS. 2 to 6 and FIGS. 10 and 11, the water diverting seat 113 includes a water diverting cavity 1131, a first outlet hole 1132 communicated with the water diverting cavity 1131, and a second outlet hole 1133 communicated with the water diverting cavity 1131. A connection member 112 connects the water mixing seat 111 with the water diverting seat 113. The connection member 112 includes a connection channel 1121 communicating the water diverting cavity 1131 with the water mixing chamber 1111. The connection member 112 is configured to connect the water mixing seat 111 with the water diverting seat 113 to achieve fixation between the water mixing seat 111 and the water diverting seat 113. For example, the water mixing seat 111, the connection member 112, and the water diverting seat 113 are configured as a one-piece and integral structure. Moreover, the connection member 112 is further configured to fluidly connect the water mixing seat 111 with the water diverting seat 113 and is configured to transfer the warm water in the water mixing chamber 1111, which is mixed in the water mixing chamber 1111, to the water diverting chamber 1131.

There is a height difference between the first inlet hole 1112 and the second inlet hole 1113, and a height difference between the second inlet hole 1113 and an end of the connection channel 1121 communicated with the water mixing chamber 1111. The end of the connection channel 1121 communicated with the water mixing chamber 1111 is located away from an opening of the water mixing chamber 1111.

In practice, when the cold water, which is input to the water mixing chamber 1111, flows through a flowing path in which the hot water flows to be input to the water mixing chamber 1111 from the second inlet hole 1113, the cold water is fully mixed with the hot water to form the mixed warm water. The mixed warm water flows to the connection channel 1121. In this way, the time length that the cold water and the hot water stay in the water mixing chamber 1111 is increased, and a flowing path of the cold water, which enters the water mixing chamber 1111 from the first inlet hole 1112, and a flowing path of the hot water, which enters the water mixing chamber 1111 from the second inlet hole 1113, are partially overlapped with each other. In this way, the cold water and the hot water are fully and evenly mixed with each other, and the temperature of the output water is ideal. In addition, in the present embodiment, the end of connection channel 1121 connected to the water mixing chamber 1111 is located away from the opening of the water mixing chamber 1111, in this way, a risk of the mixed water overflowing out from a valve opening is reduced, and the valve may be more reliable.

In the present disclosure, in order to facilitate molding of the water diverting cavity 1131. A water diverting slot may firstly be defined in the water diverting seat 113, and an opening of the water diverting slot may be blocked by a blocker 118, such that the water diverting cavity 1131 is formed.

In some embodiments, as shown in FIGS. 2 to 6, the first inlet hole 1112, the second inlet hole 1113, and the end of the connection channel 1121 communicated with the water mixing chamber 1111 are staggered to each other along a circumferential direction (indicated by an arrow W in FIG. 3) of the water mixing chamber 1111. Therefore, the first inlet channel 1141, the second inlet channel 1151, and the connection channel 1121 are staggered to each other along the circumferential direction of the water mixing chamber 1111. Furthermore, the first inlet pipe 114, the second inlet pipe 115, and the connection member 112 are staggered to each other along the circumferential direction of the water mixing chamber 1111. Therefore, the first inlet pipe 114, the second inlet pipe 115, and the connection member 112 are mounted as being staggered to each other; mounting of the first inlet pipe 114, mounting of the second inlet pipe 115, and mounting of the connection member 112 do not interfere each other.

Figure 6:
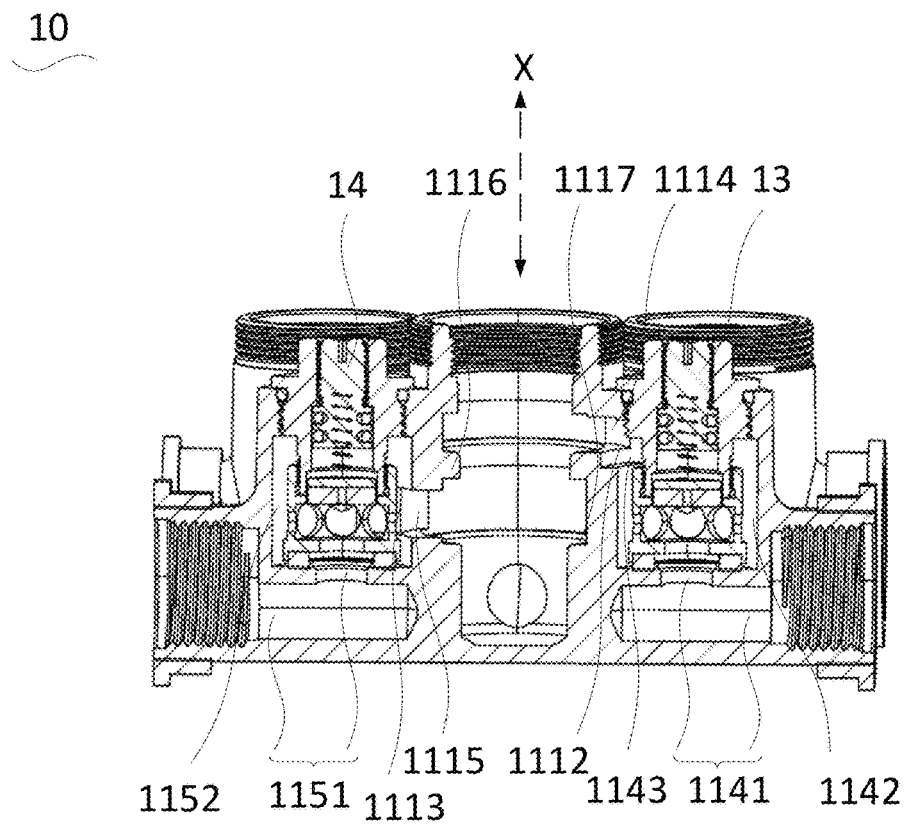
FIG. 6 is a cross-sectional view of an assembly formed by the concealed valve body shown in FIG. 2, a first check valve, and a second check valve, taken along a line A-A.
Figure 7:
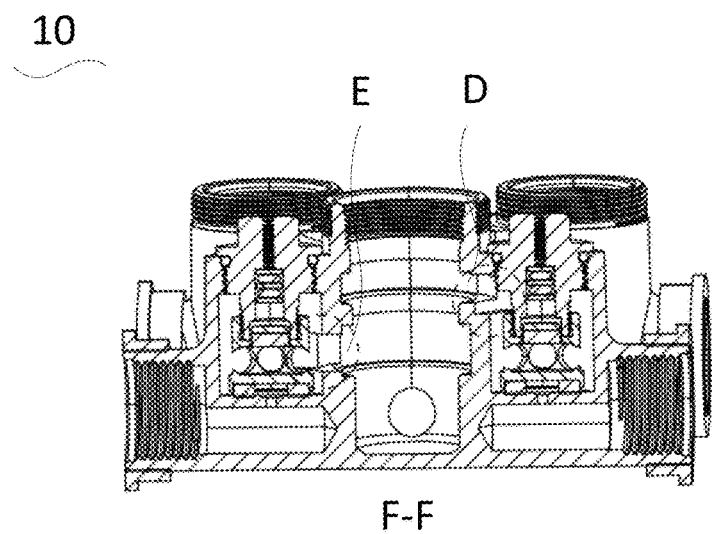
FIG. 7 is a cross-sectional view of an assembly formed by the concealed valve body shown in FIG. 2, the first check valve, and the second check valve, taken along a line F-F.
Figure 8:
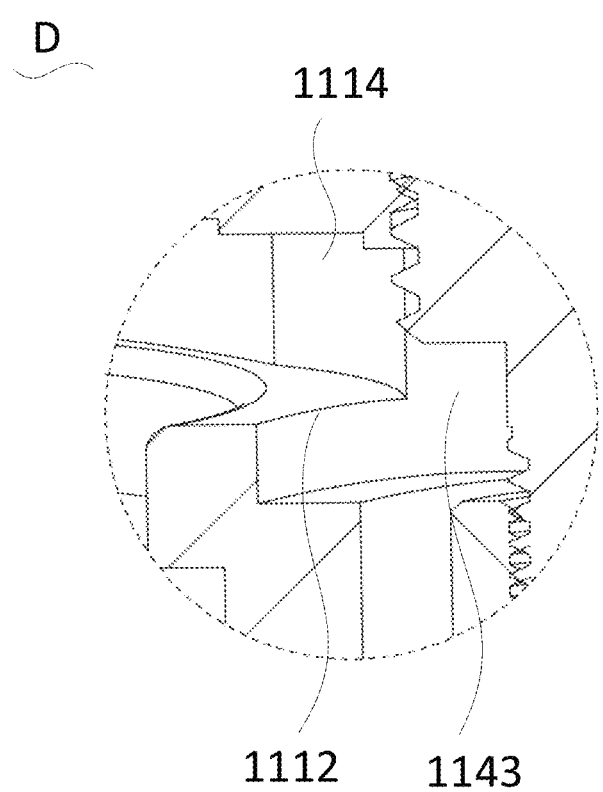
FIG. 8 is an enlarged view of a portion D of the assembly shown in FIG. 7, formed by the concealed valve body shown in FIG. 2, the first check valve, and the second check valve.
Figure 9:
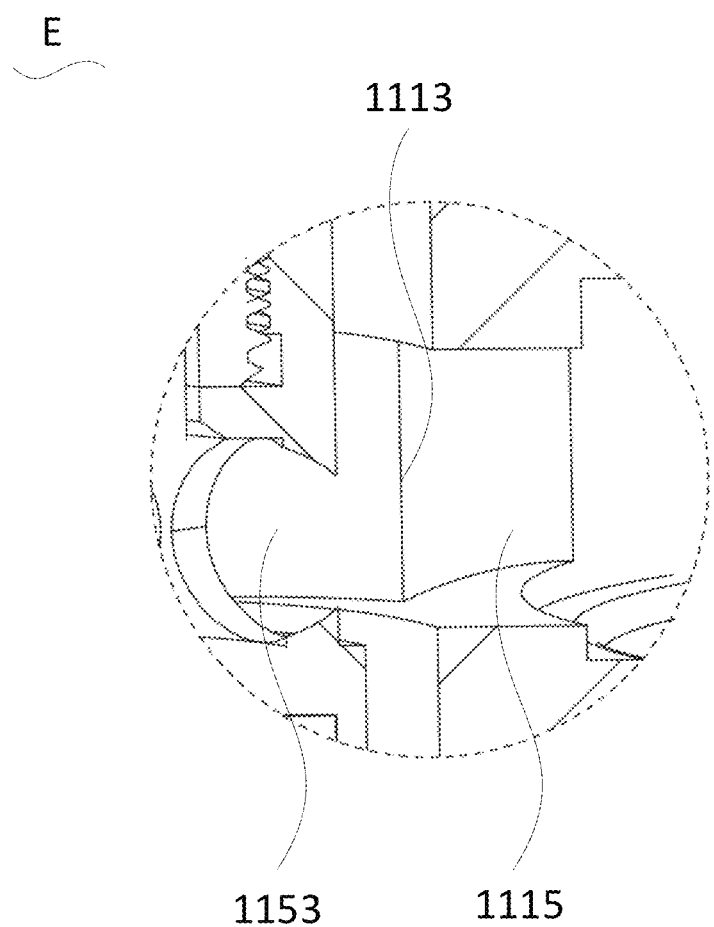
FIG. 9 is an enlarged view of a portion E of the assembly shown in FIG. 7, formed by the concealed valve body shown in FIG. 2, the first check valve, and the second check valve.

In some embodiments, as shown in FIGS. 2 to 6, a chamber wall of the water mixing chamber 1111 is protruding to form a first separating ring 1116 and a second separating ring 1117. The first inlet hole 1112 and the second inlet hole 1113 are separated from each other by the first separating ring 1116. The second inlet hole 1113 is separated from the end of the connection channel 1121 away from the water diverting seat 113 by the second separating ring 1117. For example, the first inlet hole 1112 is located on a side of the first separating ring 1116 facing the opening of the water mixing chamber 1111. The second inlet hole 1113 is located between the first separating ring 1116 and the second separating ring 1117. The end of the connection channel 1121 away from the water diverting seat 113 is located on a side of the second separating ring 1117 facing away from the opening of the water mixing chamber 1111. Alternatively, as shown in FIG. 6, the first inlet hole 1112 is disposed on the side of the first separating ring 1116 facing towards the opening of the water mixing chamber 1111; the second inlet hole 1113 is disposed between the first separating ring 1116 and the second separating ring 1117; and the end of the connection channel 1121 away from the water diverting seat 113 is disposed on the second separating ring 1117.

Figure 11:
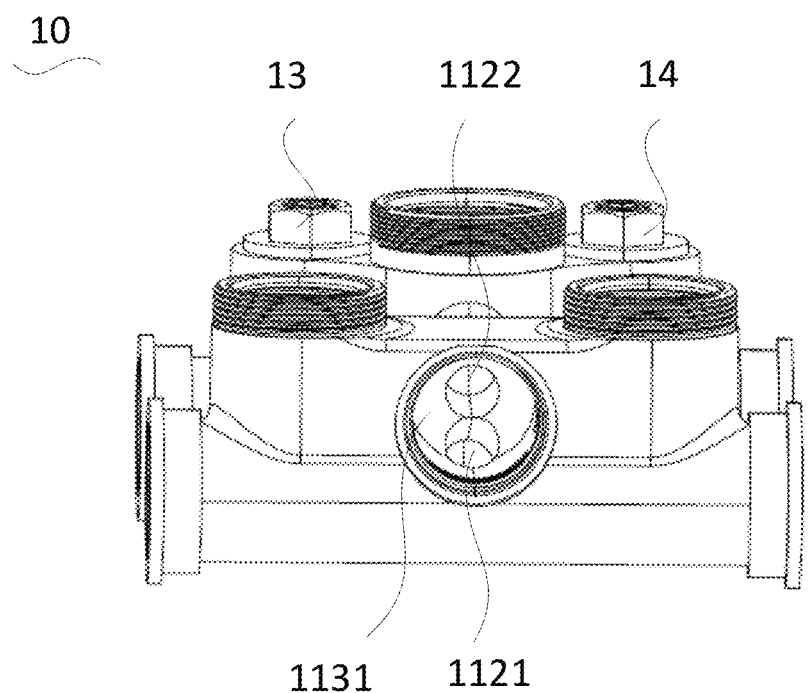
FIG. 11 is a right side view of the assembly shown in FIG. 10, which is formed by the concealed valve body shown in FIG. 2, the first check valve, and the second check valve, omitting a blocker.
Figure 12:
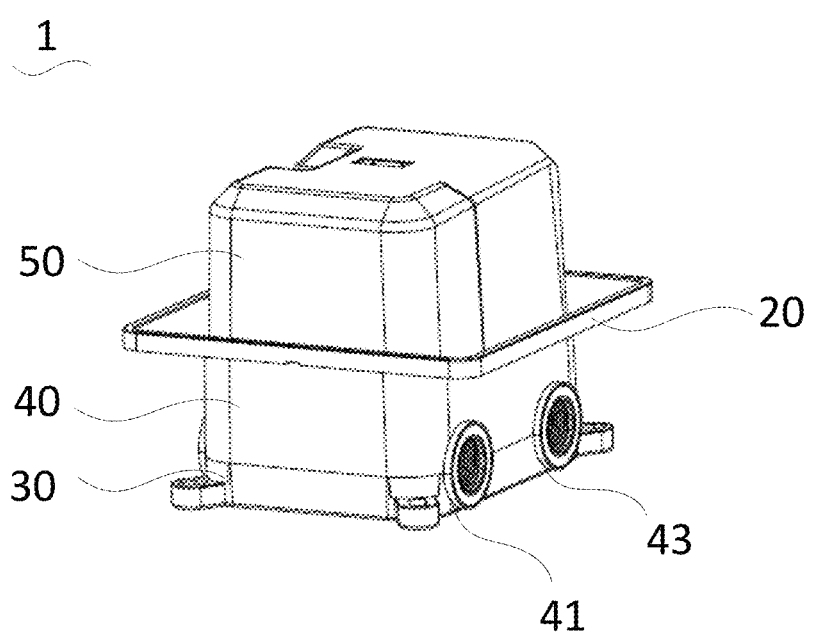
FIG. 12 is a schematic view of a concealed faucet according to an embodiment of the present disclosure.

As shown in FIG. 11, the water mixing chamber 1111 receives a mixing valve core 12. The mixing valve core 12 is configured to control a ratio of water input from the first inlet hole 1112 to water input from the second inlet hole 1113, such that the water temperature may be regulated.

The first separating ring 1116 and the second separating ring 1117 are configured to support and mount the mixing valve core 12. In practice, the mixing valve core 12 extends through a center hole of the first separating ring 1116 and a center hole of the second separating ring 1117 and contacts a wall of the center hole of the first separating ring 1116 and a wall of the center hole of the second separating ring 1117. Due to the first separating ring 1116 and the second separating ring 1117, a gap is defined between the mixing valve core 12 and a chamber wall of the water mixing chamber 1111. The cold water of the first inlet hole 1112 and the hot water of the second inlet hole 1113 may be prevented from flowing smoothly into the water mixing chamber 1111 when the mixing valve core 12 tightly contacts the chamber wall of the water mixing chamber 1111. Therefore, the above configuration of the present application ensures the cold water and the hot water to be input to the water mixing chamber 1111 reliably.

In the embodiment in which the end of the connection channel 1121 away from the water diverting seat 113 is located on the second separating ring 1117, the mixing valve core 12 tightly contacts the wall of the center hole of the second separating ring 1117, resulting in a speed of the warm water flowing to the connection channel 1121 being reduced. Therefore, a flowing speed of the cold water and a flowing speed of the hot water are also reduced, and the time length of the cold water and the hot water staying in the water mixing chamber 1111 is increased, and the cold water and the hot water may be mixed more fully with each other.

In some embodiments, the water mixing seat 111 further includes a first guide port 1114 communicating with the water mixing chamber 1111 and the first inlet hole 1112. A size of the first guide port 1114 gradually increases from a side near the first inlet pipe 114 to a side away from the first inlet pipe 114.

The water mixing seat 111 further includes a second guide port 1115 communicating with the water mixing chamber 1111 and the second inlet hole 1113. A size of the second guide port 1115 gradually increases from a side near the second inlet pipe 115 towards a side away from the second inlet pipe 115.

In some embodiments, the water mixing seat 111 further includes the first guide port 1114 communicating with the water mixing chamber 1111 and the first inlet hole 1112. A size of the first guide port 1114 gradually increases from the side near the first inlet pipe 114 towards the side away from the first inlet pipe 114. The water mixing seat 111 further includes the second guide port 1115 communicating with the water mixing chamber 1111 and the second inlet hole 1113. A size of the second guide port 1115 gradually increases from the side near the second inlet pipe 115 toward the side away from the second inlet pipe 115.

It is understood that cold water in the first inlet hole 1112 enters the water mixing chamber 1111 via the first guide port 1114, and the hot water in the second inlet hole 1113 enters the water mixing chamber 1111 via the second guide port 1115.

A size of the first guide port 1114 gradually increasing from the side near the first inlet pipe 114 toward the side away from the first inlet pipe 114 means that a cross-sectional area or an inner diameter of the first guide port 1114 gradually increases from the side of the first guide port 1114 near the first inlet pipe 114 toward the side away from the first inlet pipe 114. A size of the second guide port 1115 gradually increasing from the side near the second inlet pipe 115 toward the side away from the second inlet pipe 115 means that a cross-sectional area or an inner diameter of the second guide port 1115 gradually increases from the side of the second guide port 1115 near the second inlet pipe 115 toward the side away from the second inlet pipe 115.

Specifically, the size of the first inlet hole 1112 is much smaller than the size of the water mixing chamber 1111. When the cold water enters the water mixing chamber 1111 from the first inlet hole 1112, due to a sudden increase in a space, a burst may be generated, and a large impact may be applied to the mixing valve core 12. In the present embodiment, the size of the first guide port 1114 gradually increases from the side near the first inlet pipe 114 toward the side away from the first inlet pipe 114. In this way, when the cold water in the first guide port 1114 flows to the water mixing chamber 1111, a space allowing the cold water to flow gradually increases. Therefore, the cold water is gradually diffused in the first guide port 1114 before flowing into the water mixing chamber 1111, the impact applied to the mixing valve core 12, caused by the cold water is reduced, and the service life of the mixing valve core 12 is extended.

Similarly, the size of the second inlet hole 1113 is much smaller than the size of the water mixing chamber 1111. When the hot water directly enters the water mixing chamber 1111 from the second inlet hole 1113, a large impact is applied to the mixing valve core 12. In the present embodiment, the size of the second inlet port 1115 gradually increases from the side near the second inlet pipe 115 towards the side away from the second inlet pipe 115. Therefore, the hot water is gradually diffused in the second inlet port 1115 before flowing into the water mixing chamber 1111, the impact applied to the mixing valve core 12, caused by the hot water is reduced, the service life of the mixing valve core 12 is further extended.

In some embodiments, the first inlet pipe 114 includes a first mounting slot 1142 and a third guide port 1143. A first check valve 13 is mounted in the first mounting slot 1142. The first inlet channel 1141 is communicated with the first mounting slot 1142. The third guide port 1143 is communicated with the first mounting slot 1142. A size of the third guide port 1143 gradually decreases from a side away from the water mixing seat 111 towards a side near the water mixing seat 111.

The second inlet pipe 115 includes a second mounting slot 1152 and a fourth guide port 1153. A second check valve 14 is received in the second mounting slot 1152. The second inlet channel 1151 is communicated with the second mounting slot 1152. The fourth guide port 1153 is communicated with the second mounting slot 1152. A size of the fourth guide port 1153 gradually decreases from a side away from the water mixing seat 111 towards a side near the water mixing seat 111.

In practice, the cold water flows through the first inlet channel 1141, the first mounting slot 1142, the third guide port 1143, the first inlet hole 1112, and the first guide port 1114 successively to enter the water mixing chamber 1111. The hot water flows through the second inlet channel 1151, the second mounting slot 1152, the fourth guide port 1153, the second inlet hole 1113, and the second guide port 1115 successively to enter the water mixing chamber 1111.

For example, a shape and a size of the first mounting slot 1142 is the same as a shape and a size of the second mounting slot 1152, a shape and a size of the third guide port 1143 is the same as a shape and a size of the fourth guide port 1153. In this way, the first mounting slot 1142 and the second mounting slot 1152 can be formed by performing a same processing method and using a same mold, and the third guide port 1143 and the fourth guide port 1153 can be formed by performing a same processing method and using a same mold.

The first check valve 13 is mounted in the first mounting slot 1142, and the second check valve 14 is mounted in the second mounting slot 1152. The first check valve 13 and the second check valve 14 may prevent water in the first inlet channel 1141 and the second inlet channel 1151 from flowing reversely. On the one hand, reliability of inputting the cold water and the hot water is ensured. On the other hand, noise generated by the water flowing reversely may be reduced, improving a noise reduction effect.

According to fluid mechanics, when a flowing amount is constant, as a cross-sectional area decreases, a flowing speed is increased. The size of the third guide port 1143 gradually decreases from the side away from the water mixing seat 111 towards the side near the water mixing seat 111. Therefore, when a certain amount of cold water enters the third guide port 1143, the flowing speed of the cold water is increased due to the size of the third guide port 1143 being gradually decreasing, such that a time length for the cold water flowing into the water mixing chamber 1111 is reduced. Similarly, the size of the fourth guide port 1153 gradually decreases from the side away from the water mixing seat 111 towards the side near the water mixing seat 111. In this way, the flowing speed of the hot water into the water mixing chamber 1111 is also increased. Therefore, response sensitivity of the valve body is higher.

Figure 10:
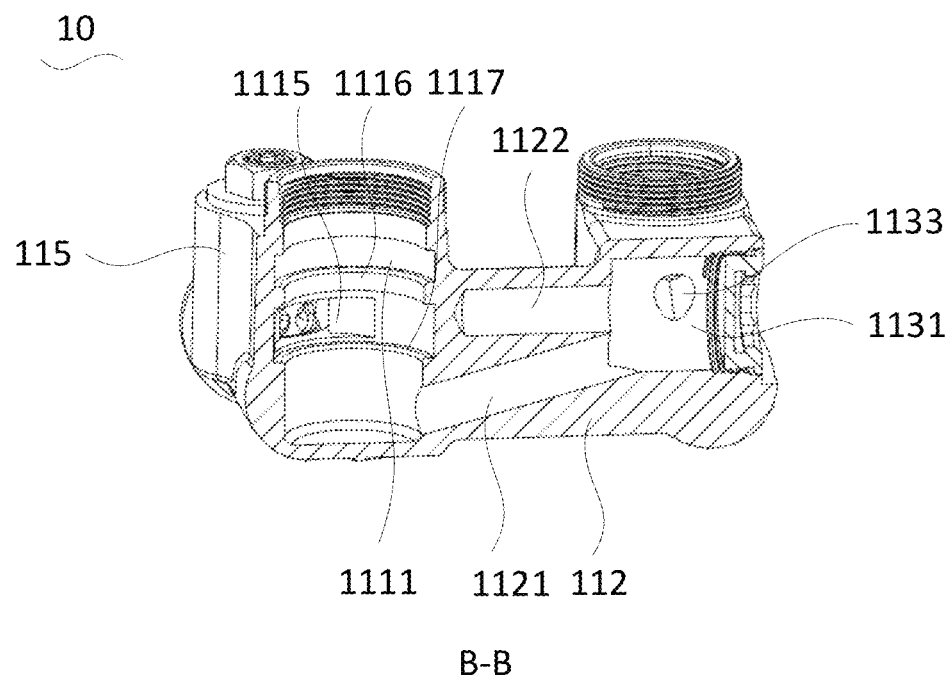
FIG. 10 is a cross-sectional view of the assembly formed by the concealed valve body shown in FIG. 2, the first check valve, and the second check valve, taken along a line B-B.

As shown in FIGS. 10 and 11, in some embodiments, the concealed valve body 11 includes at least a slot 1122 defined in the connection member 112. An opening of the slot 1122 is communicated with the water diverting cavity 1131 and is not communicated with the water mixing chamber 1111.

For example, the slot 1122 may be a strip-shaped slot, a circular slot, or a slot in other shapes.

The opening of the slot 1122 is not communicated with the water mixing chamber 1111, enabling the mixed water in the water mixing chamber 1111 to flow into the water diverting cavity 1131 through only the connection channel 1121. The opening of the slot 1122 is communicated to the water diverting cavity 1131. Therefore, a small portion of the mixed water transferred to the water diverting cavity 1131 through the connection channel 1121 flows into the slot 1122, such that a water pressure in the water diverting cavity 1131 is reduced, extending the service life of the water diverting seat 113.

In addition, in order to enhance mechanical strength of the connection between the water diverting seat 113 and the water mixing seat 111, a width of the connection member 112 in the axial direction of the water mixing chamber 1111 needs to be increased. However, this configuration leads to an increase in material for making the connection member 112, and a weight of the entire valve body may be increased. Therefore, in this case, the slot 1122 is defined. Due to the slot 1122, strength of the connection of the connection member 112, the water mixing seat 111, and the water diverting seat is ensured, and furthermore, the weight of the connection member 112 is reduced appropriately.

Further, in some embodiments, the slot 1122 is defined in the water diverting seat 113 and the connection member 112 and terminates at a connection between the water mixing seat 111 and the connection member 112. Alternatively, the slot 1122 is defined in the water diverting seat 113 and the connection member 112 and terminates at a portion of the connection member 112 near the water mixing seat 111.

That is, the slot 1122 extends along a length direction of the connection member 112 and occupies at least a majority of the connection member 112 along the length direction thereof. It is understood that, as the length of the slot 1122 increases, a larger weight is reduced. Therefore, the weight of the valve body is further reduced.

In some embodiments, the opening of the slot 1122 and the end of the connection channel 1121 away from the water mixing seat 111 are located on a same end face and are disposed in close proximity to each other. In this way, after the mixed water is input to the water diverting cavity 1131 from the connection channel 1121, the mixed water is quickly diverted to flow into the slot 1122 through the opening of the slot 1122, such that a burst, which is generated due to a sudden increase in the space during the warm water entering the water diverting chamber 1131, is reduced. A water pressure applied on a cavity wall of the water diverting cavity 1131 is reduced, and the service life of the valve body is increased.

For example, an axis of the slot 1122 is tilted relative to an axis of the connection channel 1121, such that an acute angle therebetween is formed.

In an example, the axis of the slot 1122 is substantially perpendicular to an axis of the water mixing chamber 1111. The connection channel 1121 is inclined, with respect to the axis of the slot 1122, from the water diverting seat 113 to the water mixing seat 111. In this case, after the cold water and the hot water are mixed in the water mixing seat 111, the mixed water is transferred to the water diverting chamber 1131 of the water diverting seat 113 through the connection channel 1121 of the connection member 112. On the one hand, the mixed water needs to overcome the gravity to some extent, such that the water pressure is reduced. On the other hand, a portion of the mixed water that enters the water diverting seat 113 flows into the slot 1122. Therefore, in addition to reducing the water pressure, strength of connection between the connection member 112 with the water dividing seat 113 and connection between the connection member 112 and the water mixing seat 111 is ensured, and the weight of the valve body is reduced, materials are saved, and costs are reduced.

In some embodiments, a diameter of the slot 1122 is substantially the same as a diameter of the connection channel 1121; and/or a height of the connection member 112 along the axial direction of the water mixing chamber 1111 is slightly less than a height of the water diverting seat 113 along the axial direction of the water mixing chamber 1111.

The diameter of the slot 1122 is substantially the same as the diameter of the connection channel 1121. In this way, the slot 1122 and the connection channel 1121 may be obtained by using the same components during a machining process, a variety of components may be omitted, and the machining process may be performed easily.

The height of the connection member 112 along the axial direction of the water mixing chamber 1111 is slightly less than the height of the diverting seat 113 along the axial direction of the water mixing chamber 1111. It means that, in the axial direction of the water mixing chamber 1111, the connection member 112 is slightly inwardly recessed relative to the diverting seat 113. For example, in the axial direction of the water mixing chamber 1111, the connection member 112 is inwardly recessed relative to the water dividing seat 113 by 1 mm, 1.5 mm, and so on. In this way, when strength of the connection between the connection member 112 and the water dividing seat 113 and strength of the connection between the connection member 112 and the water mixing seat 111 is ensured, the connection member 112 is not excessively heavy. That is, with this configuration, the connection strength is improved, and at the same time, the weight of the valve body is reduced.

As shown in FIGS. 2, 3, 4, and 5, the first outlet pipe 116 includes a first outlet channel 1162 and a first outlet chamber 1161. The first outlet hole 1132 communicates the water diverting cavity 1131 with the first outlet chamber 1161. The first outlet chamber 1161 is communicated with the first outlet channel 1162. The second outlet pipe 117 includes a second outlet channel 1172 and a second outlet chamber 1171. The second outlet hole 1133 communicates the water diverting cavity 1131 with the second outlet chamber 1171. The second outlet chamber 1171 is communicated with the second outlet channel 1172.

The water diverting seat 113 is fixedly and fluidly connected to both the first outlet pipe 116 and the second outlet pipe 117. For example, the water diverting seat 113, the first outlet pipe 116, and the second outlet pipe 117 are configured as a one-piece and integral structure.

As shown in FIG. 1, in an example, the first outlet pipe 116 is fluidly connected to an external outlet pipe of one of the handheld showerhead 2 and the top showerhead 3; and the second outlet pipe 117 is fluidly connected to an external outlet pipe of the other one of the handheld showerhead 2 and the top showerhead 3. For ease of illustration, in the following embodiments, the first outlet pipe 116 is fluidly connected to the external outlet pipe of the handheld showerhead 2, and the second outlet pipe 117 is fluidly connected to the external outlet pipe of the top showerhead 3. In the present embodiment, the warm water in the water diverting cavity 1131 flows through the first outlet hole 1132, the first outlet chamber 1161, and the first outlet channel 1162 successively, and is further sprayed out from the handheld showerhead 2. The warm water in the water diverting cavity 1131 flows through the second outlet hole 1133, the second outlet chamber 1171, and the second outlet channel 1172 successively, and is further sprayed out from the top showerhead 3.

A first water outlet valve 15 is received in the first outlet chamber 1161. A second water outlet valve 16 is received in the second outlet chamber 1171. The first water outlet valve 15 is configured to adjust an amount of water output from the first water outlet chamber 1161, and the second water outlet valve 16 is configured to adjust an amount of water output from the second outlet chamber 1171.

Figure 15:
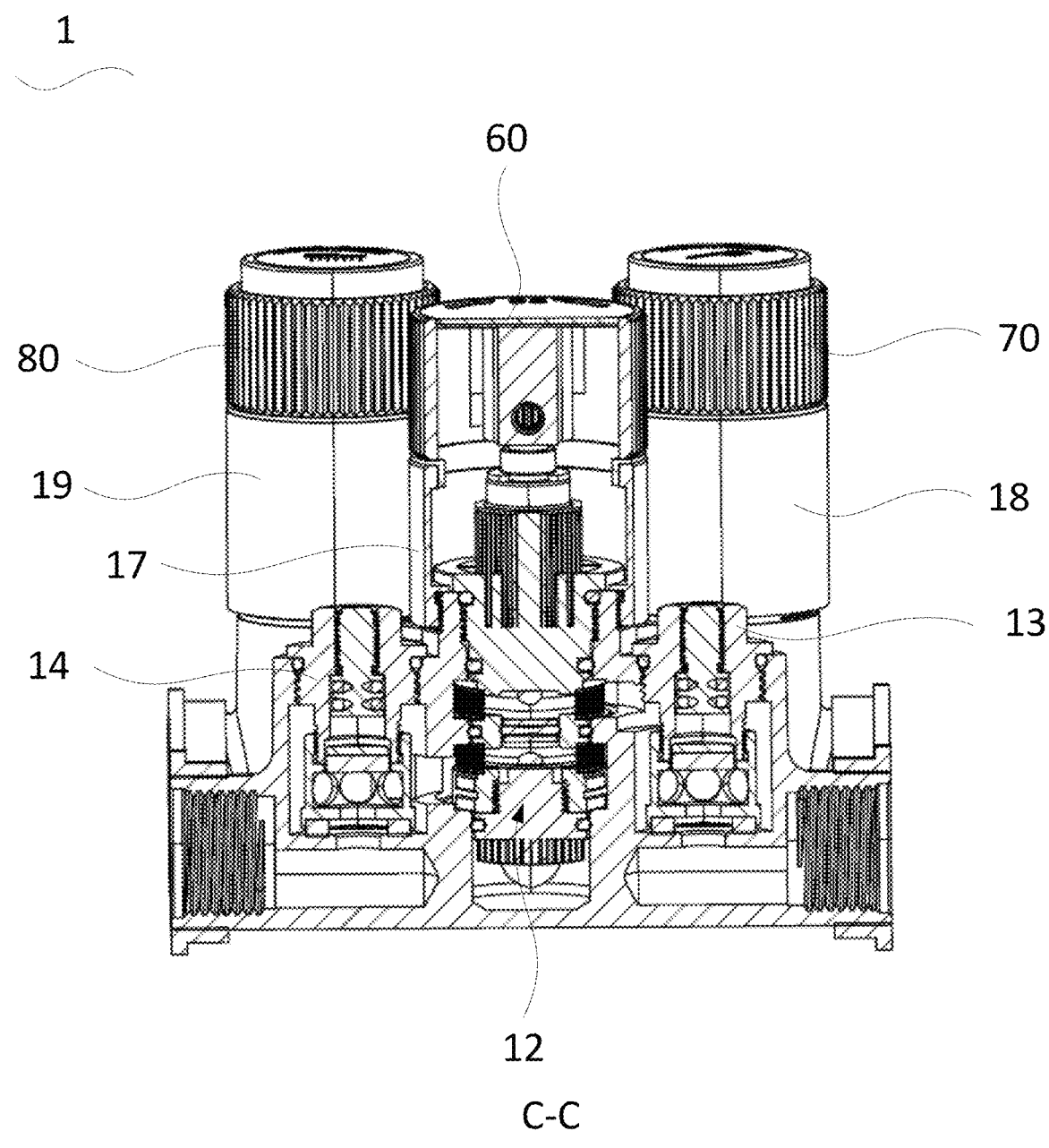
FIG. 15 is a cross-sectional view, taken along a line C-C, of the concealed faucet shown in FIG. 14, omitting a displaying device.
Figure 16:
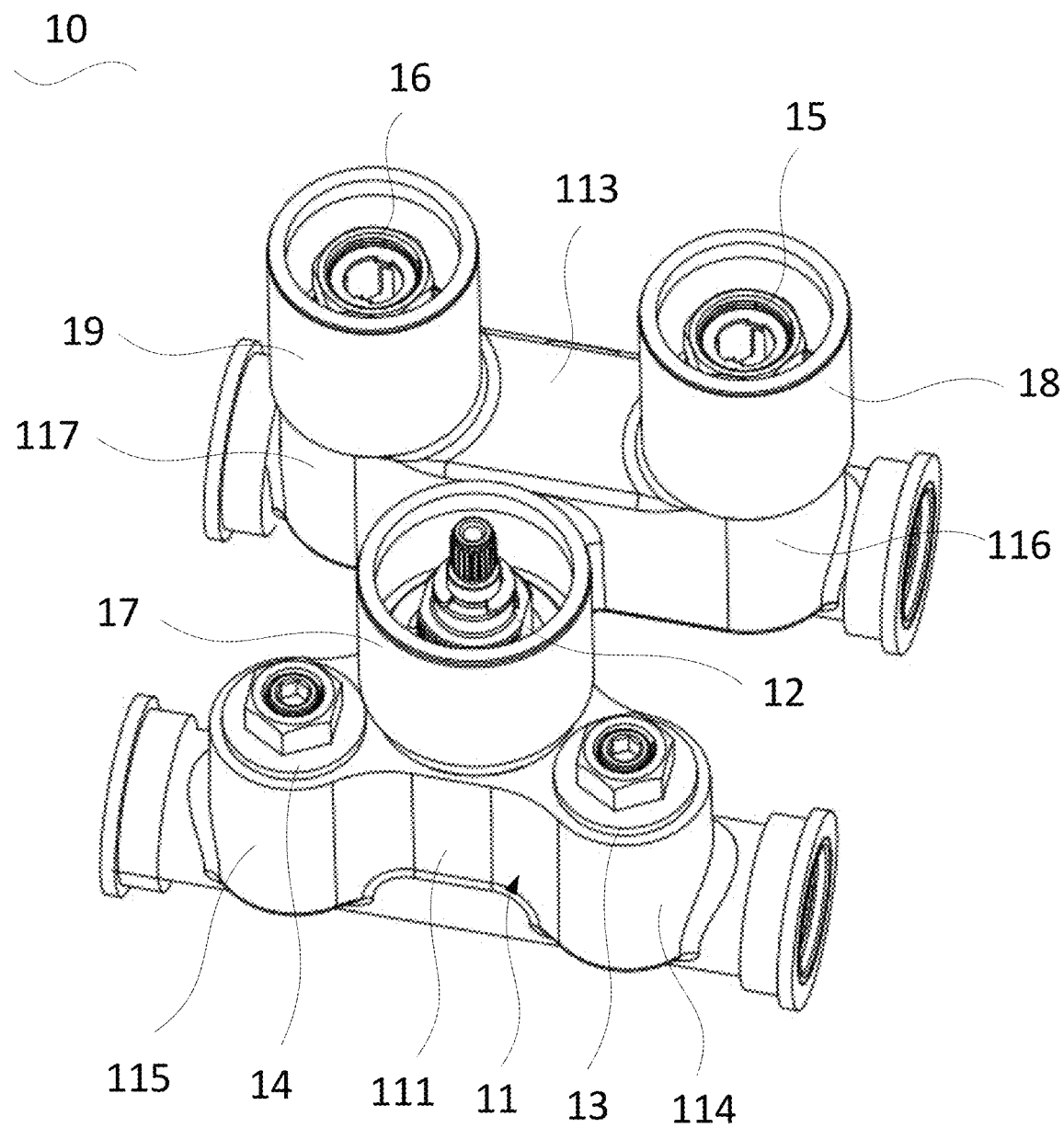
FIG. 16 is a schematic view of a concealed valve according to an embodiment of the present disclosure.
Figure 17:
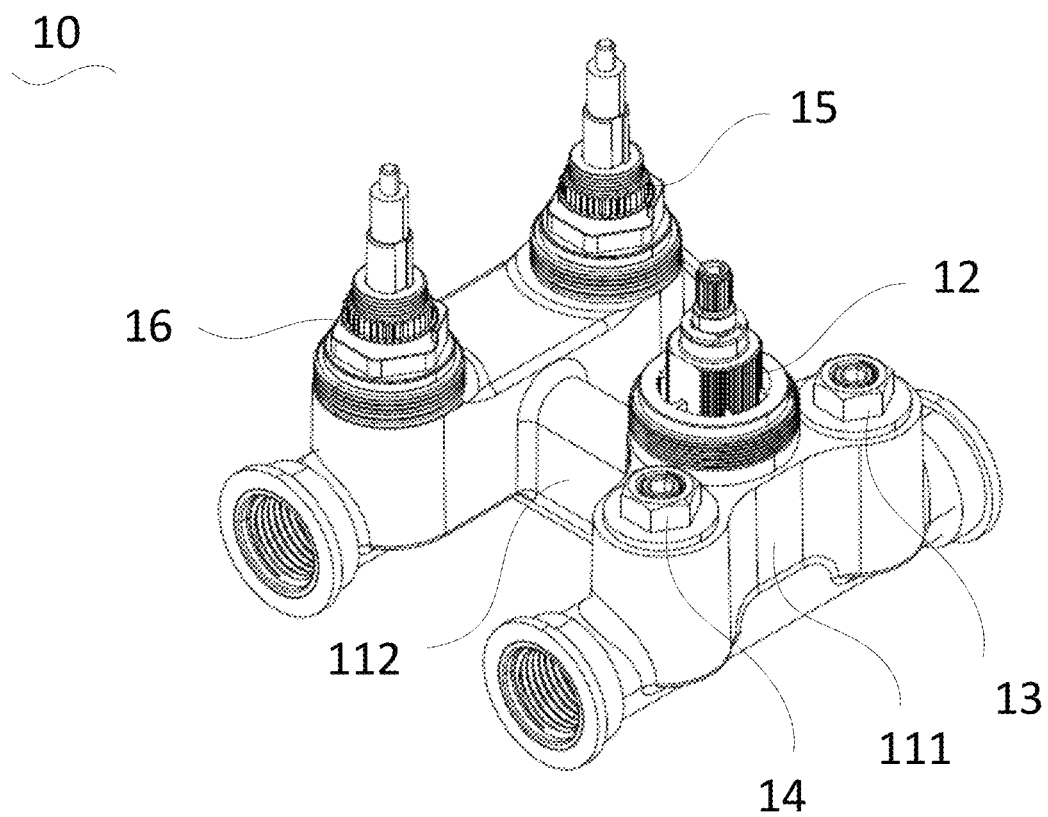
FIG. 17 is a schematic view of the concealed valve shown in FIG. 16, omitting the assembly formed by the concealed valve body shown in FIG. 2, the first check valve, and the second check valve.

As shown in FIG. 2 and FIGS. 15 and 16, the present disclosure further provides a concealed valve 10, which is configured for the concealed faucet 1. The concealed valve 10 includes the mixing valve core 12, a mixing valve core sleeve 17, a first check valve 13, a second check valve 14, a first water outlet valve 15, a second water outlet valve 16, a first outlet valve sleeve 18, a second outlet valve sleeve 19, and the concealed valve body 11 in any one of the above-mentioned embodiments.

The mixing valve core 12 is mounted in the water mixing chamber 1111 and is configured to adjust the ratio of the water inlet from the first inlet hole 1112 to the water inlet from the second inlet hole 1113, such that the water temperature is adjusted. For example, the mixing valve core sleeve 17 is disposed outside the water mixing seat 111 and connected to the water mixing seat 111. An end of the mixing valve core 12 extends into the water mixing chamber 1111, and the other end of the mixing valve core 12 is sleeved in the mixing valve core sleeve 17.

The first water outlet valve 15 is mounted within the first outlet chamber 1161 and is configured to adjust the amount of water output from the first outlet chamber 1161. For example, the first outlet valve sleeve 18 is disposed outside the first outlet pipe 116 and connected to the first outlet pipe 116. An end of the first water outlet valve 15 extends into the first outlet chamber 1161, and the other end of the first water outlet valve 15 is sleeved within the first outlet valve sleeve 18.

A second water outlet valve 16 is mounted within the second outlet chamber 1171 and is configured to adjust the amount of water output from the second outlet chamber 1171. For example, the second outlet valve sleeve 19 is disposed outside the second outlet pipe 117 and is connected to the second outlet pipe 117. An end of the second water outlet valve 16 extends into the second outlet chamber 1171, and the other end of the second water outlet valve 16 is sleeved within the second outlet valve sleeve 19.

The first check valve 13 is mounted in the first mounting slot 1142 of the first inlet pipe 114 to prevent the cold water in the first inlet hole 1112 from flowing reversely. The second check valve 14 is mounted in a second mounting slot 1152 of the second water inlet pipe 115 to prevent the cold water in the second inlet hole 1113 from flowing reversely.

As shown in FIG. 1 and FIGS. 12 to 17, the present disclosure further provides a concealed faucet 1 including a displaying device 20, a water-mixing operation switch 60, a first water-outlet operation switch 70, a second water-outlet operation switch 80, and the concealed valve 10 as described in any one of the above embodiments.

The displaying device 20 has a concealed side and a displaying side opposite to the concealed side. The concealed valve body 11 is disposed on the concealed side. The mixing valve core 12, the first outlet valve spool, and the second outlet valve spool may pass through the displaying device 20 to protrude from the displaying side. The water-mixing operation switch 60, the first water-outlet operation switch 70, and the second water-outlet operation switch 80 are all disposed on the displaying side. The water-mixing operation switch 60 is connected to the mixing valve core 12 and is configured to control the mixing valve core 12. The first water-outlet operation switch 70 is connected to the first outlet valve core and is configured to control the first outlet valve core. The second water-outlet operation switch 80 is connected to the second outlet valve core and is configured to control the second outlet valve core.

It is understood that, the displaying side of the displaying device 20 refers to a side exposed out of the wall and is not obscured by the wall. The user may observe information, such as water temperature, time, and so on, displayed on the displaying device 20 from the displaying side. The concealed side of the displaying device 20 is a side buried inside the wall and is obscured by the wall, such that concealed mounting can be achieved.

The in-wall concealed faucet further includes a base 30, a housing 40, and an upper cover 50. The base 30 and the housing 40 are disposed on the concealed side of the displaying device 20. The base 30 is connected to the housing 40, and the base 30 and the housing 40 cooperatively define a receiving cavity to receive the concealed valve 10. The upper cover 50 is disposed on the displaying side of the displaying device 20 and covers the water-mixing operation switch 60, the first water-outlet operation switch 70, and the second water-outlet operation switch 80. The base 30, the housing 40, and the upper cover 50 cooperatively protect the concealed valve 10, the water-mixing operation switch 60, the first water-outlet operation switch 70, and the second water-outlet operation switch 80 during transportation and sale. The concealed valve 10, the water-mixing operation switch 60, the first water-outlet operation switch 70, and the second water-outlet operation switch 80 may be protected from collision.

Figure 13:
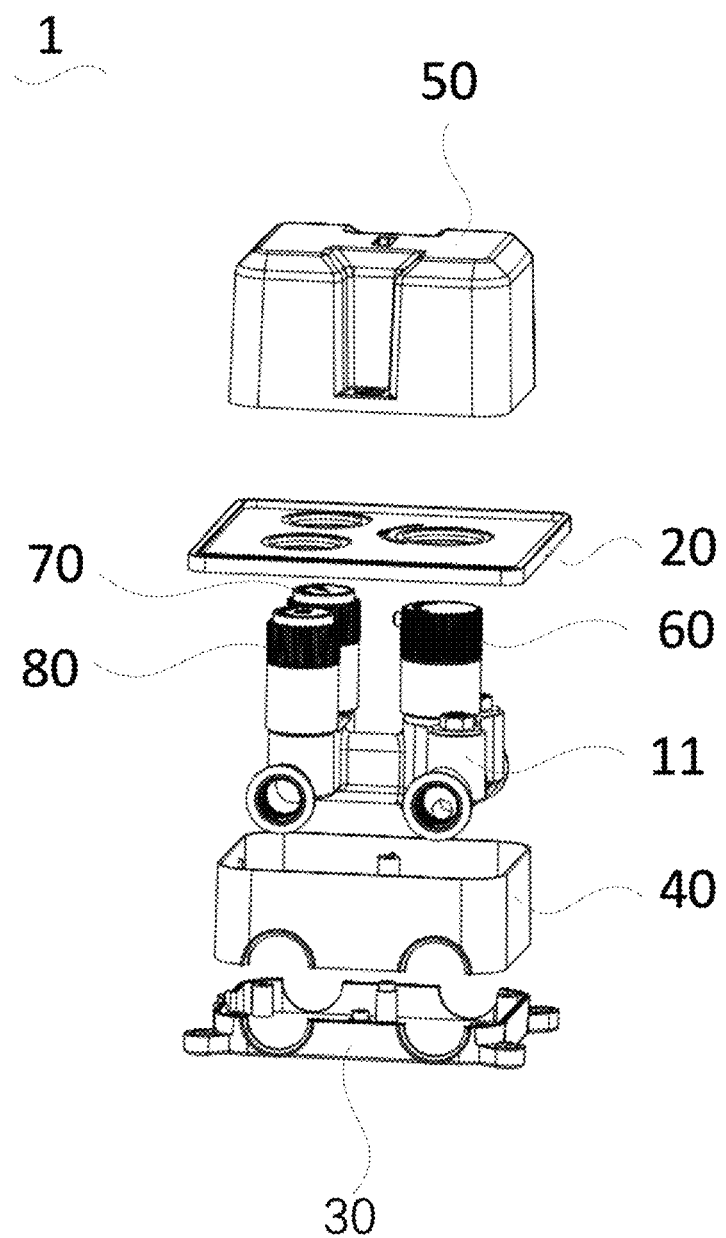
FIG. 13 is an exploded view of the concealed faucet shown in FIG. 12.
Figure 14:
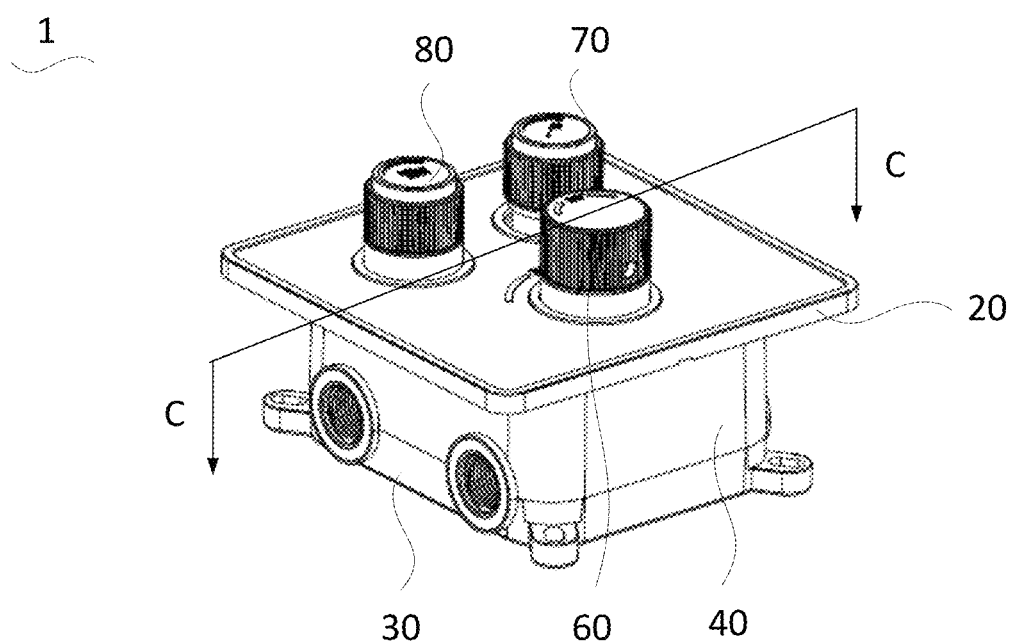
FIG. 14 is a schematic view of the concealed faucet shown in FIG. 12, omitting an upper cover.

In practice, when mounting the faucet to the wall, the in-wall concealed faucet (where the base 30, the housing 40, and the upper cover 50 are assembled to each other) and the displaying device 20 are provided separately. Firstly, the upper cover 50 is removed, and then the base 30, the housing 40, and the concealed valve 10 are buried in the wall, subsequently, the displaying device 20 is mounted to the housing 40. The displaying device 20 has through holes, after mounting the displaying device 20, the first water-mixing operation switch 60, the first water-outlet operation switch 70, and the second water-outlet operation switch 80 extend through the through holes of the displaying device 20 and are exposed outside the wall. In particular, FIG. 13 shows that the upper cover 50 is removed, and the base 30, the housing 40, and the displaying device 20 are ready to be mounted to the wall; and FIG. 14 shows that the base 30, the housing 40, and the displaying device 20 are assembled to each other.

In addition, a first mounting hole 41, a second mounting hole 42, a third mounting hole 43, and a fourth mounting hole 44 are defined between the base 30 and the housing 40. The first inlet pipe 114 extends through the first mounting hole 41 and is engaged into the first mounting hole 41. The second inlet pipe 115 extends through the second mounting hole 42 and is engaged into the second mounting hole 42. The first outlet pipe 116 extends through the third mounting hole 43 and is engaged into the third mounting hole 43. The second outlet pipe 117 extends through the fourth mounting hole 44, and is engaged with the fourth mounting hole 44.

According to the concealed valve body 11, the concealed valve 10 and the concealed faucet 1 described in the above, the first inlet hole 1112 and the second inlet hole 1113 of the concealed valve body 11 input water, such as cold water and hot water, into the water mixing chamber 1111 through the first inlet channel 1141 and the second inlet channel 1151. The first inlet hole 1112 and the second inlet hole 1113 are arranged along the axial direction of the water mixing chamber 1111, and there is a height difference between the first inlet hole 1112 and the second inlet hole 1113. In this way, a time length that the cold water and the hot water are mixed in the water mixing cavity 1111 is increased, such that the cold water and the hot water output from the first inlet runner 1141 and the second inlet runner 1151 into the water mixing cavity 1111 can be fully mixed with each other.

Various technical features of the above-described embodiments can be combined arbitrarily with each other. In order to make the description concise, the present disclosure does not describe all possible combinations. However, as long as combinations of these technical features do not cause contradiction, the combinations shall be considered as being within the scope of the present disclosure.

The above-described embodiments express only several embodiments of the present disclosure, which are described in a more specific and detailed manner. However, the description shall not be interpreted as a limitation of the scope of the patent disclosure. To be noted that, any ordinary skilled person in the art, a number of deformations and improvements can be made without departing from the concept of the present disclosure, all of which shall fall within the scope of the present disclosure. Therefore, the scope of the patent disclosure shall be subject to the appended set of claims.

What is claimed is:

1. A concealed valve body, comprising:
   a water mixing seat, comprising a water mixing chamber, a first inlet hole communicated with the water mixing chamber, and a second inlet hole communicated with the water mixing chamber;
   a first inlet pipe, having a first inlet channel that is communicated with the first inlet hole;
   a second inlet pipe, having a second inlet channel communicated with the second inlet hole;
   a water diverting seat, comprising a water diverting cavity and configured to output mixed water;
   a connection member, connected with the water mixing seat and the water diverting seat, wherein, the connection member comprises a connection channel communicated with the water diverting cavity and the water mixing chamber;
   wherein, the first inlet hole and the second inlet hole are distributed along an axial direction of the water mixing chamber, and a height difference is present between the first inlet hole and the second inlet hole; and
   at least a slot is defined in the connection member, an opening of the slot is communicated with the water diverting cavity and is dis-communicated with the water mixing chamber.

2. The concealed valve body according to claim 1, wherein, a first separating ring is protruding from a chamber wall of the water mixing chamber, and the first inlet hole and the second inlet hole are separated from each other by the first separating ring.

3. The concealed valve body according to claim 1, wherein,
   the water diverting seat further comprises: a first outlet hole communicated with the water diverting cavity, and a second outlet hole communicated with the water diverting cavity;
   wherein, another height difference is present between the second inlet hole and an end of the connection channel communicated with the water mixing chamber; the end of the connection channel communicated with the water mixing chamber is disposed away from an opening of the water mixing chamber.

4. The concealed valve body according to claim 3, wherein, a first separating ring and a second separating ring are protruding from a chamber wall of the water mixing chamber; the first inlet hole and the second inlet hole are separated from each other by the first separating ring; the second inlet hole is separated from an end of the connection channel away from the water diverting seat by the second separating ring.

5. The concealed valve body according to claim 4, wherein, the first inlet hole is located on a side of the first separating ring facing an opening of water mixing chamber, the second inlet hole is located between the first separating ring and the second separating ring, and the end of the connection channel away from the water diverting seat is located on the second diverting ring or at a side of the second diverting ring away from the opening of the water mixing chamber.

6. The concealed valve body according to claim 1, wherein,
   the water mixing seat further comprises a first guide port communicated with the water mixing chamber and the first inlet hole, a size of the first guide port gradually increases in a direction from a side near the first inlet pipe towards a side away from the first inlet pipe.

7. The concealed valve body according to claim 1, wherein,
the water mixing seat further comprises a second guide port communicated with the water mixing chamber and the second inlet hole, a size of the second guide port gradually increases in a direction from a side near the second inlet pipe towards a side away from the second inlet pipe.

8. The concealed valve body according to claim 1, wherein,
the first inlet pipe comprises a first mounting slot and a third guide port, a first check valve is mounted in the first mounting slot, the first inlet channel is communicated with the first mounting slot, the third guide port is communicated with the first mounting slot, and a size of the third guide port decreases in a direction from a side away from the water mixing seat towards a side near the water mixing seat.

9. The concealed valve body according to claim 1, wherein,
the second inlet pipe comprises a second mounting slot and a fourth guide port, a second check valve is mounted in the second mounting slot, the second inlet channel is communicated with the second mounting slot, the fourth guide port is communicated with the second mounting slot, and a size of the fourth guide port decreases in a direction from a side away from the water mixing seat towards a side near the water mixing seat.

10. The concealed valve body according to claim 1, wherein,
the slot is defined in the water diverting seat and the connection member and is terminated at a connection between the water mixing seat and the connection member.

11. The concealed valve body according to claim 1, wherein,
the slot is defined in the water diverting seat and the connection member and is terminated at a portion of the connection member near the water mixing seat.

12. The concealed valve body according to claim 1, wherein, the opening of the slot and an end of the connection channel away from the water mixing seat are located at a same end face and are close adjacent to each other.

13. The concealed valve body according to claim 1, wherein, an axis of the slot is tilted relative to an axis of the connection channel, an acute angle is generated between the axis of the slot and the axis of the connection channel.

14. The concealed valve body according to claim 13, wherein, the axis of the slot is substantially perpendicular to the axis of the water mixing chamber; and the connection channel is inclined, with respect to the axis of the slot, downwardly from the water diverting seat to the water mixing seat.

15. The concealed valve body according to claim 14, wherein, a diameter of the slot is substantially equal to a diameter of the connection channel.

16. The concealed valve body according to claim 14, wherein,
a height of the connection member along an axial direction of the water mixing chamber is slightly less than a height of the water diverting seat along the axial direction of the water mixing chamber.

17. The concealed valve body according to claim 1, wherein, the height difference between the first inlet hole and the second inlet hole is configured to enable a flowing path of water flowing from the first inlet hole and a flowing path of water flowing from the second inlet hole to be partially overlapped with each other.

18. A concealed valve, comprising:
the concealed valve body according to claim 1;
a mixing valve core, mounted in the water mixing cavity;
a first check valve, mounted in the first inlet pipe; and
a second check valve, mounted in the second inlet pipe.

19. A concealed faucet, comprising:
a displaying device, having a concealed side and a displaying side provided opposite to the concealed side;
the concealed valve according to claim 18, being disposed on the concealed side, wherein, the mixing valve core extends through the displaying device to protrude out of the displaying side; and
a water-mixing operation switch, disposed on the displaying side and connected to the mixing valve core, wherein the water-mixing operation switch is configured to control the mixing valve core.

* * * * *